No. 622,889. Patented Apr. 11, 1899.
J. B. FORSYTH.
SHEET MATERIAL FOR PACKING, MATTING, &c.
(Application filed Apr. 25, 1898.)

(Specimens.)

Witnesses:
Wm Maynadier
H. P. Guillo

Inventor:
James Bennett Forsyth
By J. E. Maynadier
Attorney

UNITED STATES PATENT OFFICE.

JAMES BENNETT FORSYTH, OF BOSTON, MASSACHUSETTS.

SHEET MATERIAL FOR PACKING, MATTING, &c.

SPECIFICATION forming part of Letters Patent No. 622,889, dated April 11, 1899.

Application filed April 25, 1898. Serial No. 678,712. (Specimens.)

*To all whom it may concern:*

Be it known that I, JAMES BENNETT FORSYTH, of Boston, in the county of Suffolk and State of Massachusetts, have invented a new and useful Sheet Material for Packing, Matting, and the Like, of which the following is a specification, reference being had to the accompanying drawings, in which—

Figure 1:
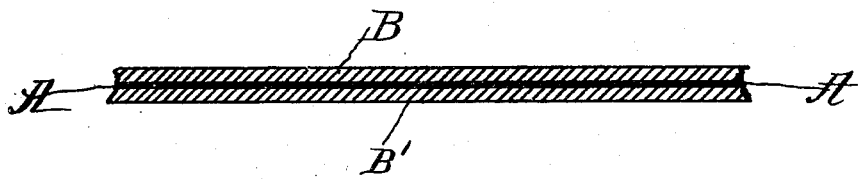
Figure 2:
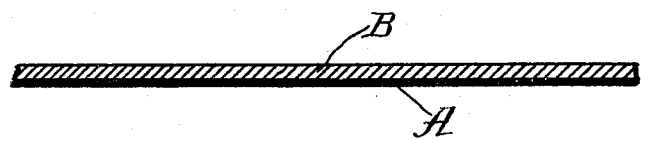

Figure 1 is a section through my sheet material. Fig. 2 is a section through another form.

My invention is a sheet material made up of a sheet, one or more, of vulcanized rubber, with a thin pliable sheet, one or more, of metal, the sheets of metal and rubber being held together in any suitable manner, but preferably by vulcanizing the rubber when in close contact with the pliable sheet metal, the object being to make a sheet material which possesses characteristics not possessed by any sheet material heretofore known—that is, it will be practically as pliable and as resilient when clamped between opposed surfaces as a sheet made up wholly of vulcanized rubber and will be as strong and as well adapted to resist stretching strain as a pliable metal sheet.

In making my material a thin pliable metal sheet A, preferably of lead, tin, or brass, is first cleaned with any suitable cleaning agent, such as camphene or naphtha, and a sheet B, of vulcanizable rubber compound, is laid thereon and temporarily secured thereto by any suitable means. The second sheet B', of vulcanizable rubber compound, is then temporarily secured, as before, to the other side of the thin metal sheet, and the sheets of rubber are then vulcanized with the pliable metal sheet between them, thus causing the rubber and thin metal sheet to cohere strongly.

When it is desired to connect the rubber sheets to the metal sheets by vulcanizing the rubber, as above explained, I find that by mixing with the vulcanizable compound metallic oxids—such as red oxid of iron, oxid of zinc, and the like—the sheet of rubber adheres more strongly to the metal sheet than is the case when a compound containing only rubber and sulfur or rubber and earthy matters and sulfur is used.

My new material possesses characteristics not heretofore possessed by any sheet material known to me, for it combines with the strength to resist stretching strains possessed by a thin pliable sheet of metal the resilient and pliable characteristics possessed by a sheet made wholly of rubber; but my new material has not the disadvantages of a rubber sheet, such as spreading under heat or pressure or becoming brittle and cracking after a comparatively short use, and my material is better adapted for use as packing, matting, and analogous uses than any other material known to me.

I am aware of the British patent to Daft, No. 237 of 1860, and I disclaim all shown or described in that patent, for I do not claim a material made by vulcanizing rubber sheets to a metal sheet.

What I claim as my invention is—

A sheet material made up of a pliable sheet, one or more, of metal, and a sheet one or more, of vulcanized rubber, united to the pliable metal sheet substantially as described.

JAMES BENNETT FORSYTH.

Witnesses:
JOHN R. SNOW,
H. P. GUILLO.